United States Patent
Lucas et al.

(10) Patent No.: US 10,625,958 B2
(45) Date of Patent: Apr. 21, 2020

(54) RAPID SWITCHING DUAL PROPPANT DELIVERY SYSTEM

(71) Applicant: Halliburton Energy Services, Inc., Houston, TX (US)

(72) Inventors: Bryan Chapman Lucas, Duncan, OK (US); Tim H. Hunter, Duncan, OK (US); Calvin L. Stegemoeller, Duncan, OK (US); Bryan John Lewis, Duncan, OK (US); Austin Carl Schaffner, Duncan, OK (US); Jim Basuki Surjaatmadja, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 181 days.

(21) Appl. No.: 15/562,635

(22) PCT Filed: May 7, 2015

(86) PCT No.: PCT/US2015/029741
§ 371 (c)(1),
(2) Date: Sep. 28, 2017

(87) PCT Pub. No.: WO2016/178694
PCT Pub. Date: Nov. 10, 2016

(65) Prior Publication Data
US 2018/0105375 A1    Apr. 19, 2018

(51) Int. Cl.
*B65G 65/00* (2006.01)
*B65G 65/40* (2006.01)
(Continued)

(52) U.S. Cl.
CPC ............. *B65G 65/40* (2013.01); *B65G 47/44* (2013.01); *B65G 49/00* (2013.01); *B65G 65/005* (2013.01);
(Continued)

(58) Field of Classification Search
CPC .......... B65G 65/40; B65G 7/44; B65G 54/32; B65G 47/44; B65G 47/40; B65G 49/00;
(Continued)

(56) References Cited

U.S. PATENT DOCUMENTS 2,238,343 A  *  4/1941  Rybeck ................ B28C 5/1843
                                                  366/14
6,481,883 B1 * 11/2002  Ellen ........................ B28C 5/04
                                                  366/18
(Continued)

FOREIGN PATENT DOCUMENTS

EP          0406819 B1    10/1993
JP          09-142665 A    6/1997
(Continued)

OTHER PUBLICATIONS

International Search Report and Written Opinion issued in related PCT Application No. PCT/US2015/029741 dated Jan. 25, 2016, 15 pages.

(Continued)

*Primary Examiner* — Anshu Bhatia
(74) *Attorney, Agent, or Firm* — John W. Wustenberg; Baker Botts L.L.P.

(57) ABSTRACT

In accordance with presently disclosed embodiments, systems and methods for using containers, instead of pneumatic transfer, to move bulk material from a transportation unit to a blender receptacle (e.g., hopper or mixer of a blender) are provided. A transportation unit may deliver multiple containers of bulk material to the well site, where multiple conveyors may deliver the containers to a location proximate the blender receptacle. Openings at the bottom of the containers are arranged adjacent one another so that the load of two containers may be delivered to the tight space occupied by the blender receptacle. Since the transportation unit is able to unload the containers of bulk material without pneumatic transfer, the containers may enable a cleaner and more efficient bulk material transfer at the site.

16 Claims, 6 Drawing Sheets

(51) Int. Cl.
*B65G 47/44* (2006.01)
*B65G 49/00* (2006.01)
*B65G 65/32* (2006.01)

(52) U.S. Cl.
CPC ........ *B65G 65/32* (2013.01); *B65G 2201/042* (2013.01); *B65G 2201/045* (2013.01)

(58) Field of Classification Search
CPC .................. B65G 65/005; B65G 65/32; B65G 2201/042; B65G 2201/045
See application file for complete search history.

(56) References Cited

U.S. PATENT DOCUMENTS

| | | |
|---|---|---|
| D688,349 S | 8/2013 | Oren et al. |
| D688,350 S | 8/2013 | Oren et al. |
| D688,351 S | 8/2013 | Oren et al. |
| D688,772 S | 8/2013 | Oren et al. |
| 8,827,118 B2 | 9/2014 | Oren |
| 2014/0083554 A1 | 3/2014 | Harris |
| 2014/0299225 A1 | 10/2014 | Oren |
| 2015/0003955 A1 | 1/2015 | Oren et al. |
| 2015/0044004 A1 | 2/2015 | Pham et al. |

FOREIGN PATENT DOCUMENTS

| | | |
|---|---|---|
| JP | 11-171302 A | 6/1999 |
| JP | 2006-123035 A | 5/2006 |

OTHER PUBLICATIONS

International Preliminary Report on Patentability issued in related PCT Application No. PCT/US2015/029741, dated Nov. 16, 2017, 12 pages.

* cited by examiner

RAPID SWITCHING DUAL PROPPANT DELIVERY SYSTEM

CROSS-REFERENCE TO RELATED APPLICATION

The present application is a U.S. National Stage Application of International Application No. PCT/US2015/029741 filed May 7, 2015, which is incorporated herein by reference in its entirety for all purposes.

TECHNICAL FIELD

The present disclosure relates generally to transferring solid or liquid bulk materials for well operations, and more particularly, to a rapid switching dual proppant delivery system.

BACKGROUND

During the drilling and completion of oil and gas wells, various wellbore treating fluids are used for a number of purposes. For example, high viscosity gels and proppant infused liquids are used to create fractures in oil and gas bearing formations to increase production. High viscosity and high density gels are also used to maintain positive hydrostatic pressure in the well while limiting flow of well fluids into earth formations during installation of completion equipment. High viscosity fluids are used to flow sand into wells during gravel packing operations. The high viscosity fluids are normally produced by mixing dry powder and/or granular materials and agents with water at the well site as they are needed for the particular treatment. Systems for metering and mixing the various materials are nominally portable, e.g., skid- or truck-mounted, since they are needed for only short periods of time at a well site.

The powder or granular treating material is normally transported to a well site in a commercial or common carrier tank truck. Once the tank truck and mixing system are at the well site, the dry powder material (bulk material) must be transferred or conveyed from the tank truck into a supply tank for metering into a blender as needed. The bulk material is usually transferred from the tank truck pneumatically. More specifically, the bulk material is blown pneumatically from the tank truck into an on-location storage/delivery system (e.g., silo). The storage/delivery system may then deliver the bulk material onto a conveyor or into a hopper, which meters the bulk material through a chute into a blender tub.

The pneumatic conveying process used to deliver bulk material from the tank truck can be a time-consuming process. In addition, some well locations are arranged without a large amount of space to accommodate tank trucks, such that only a limited number of available tank trucks can be positioned to pneumatically fill the storage/delivery system at a given time. Accordingly, the pneumatic conveying process can lead to dead time of equipment usage and relatively high detention costs or demurrage costs associated with the tank trucks, hoses, and related equipment that are on-location during this time.

Furthermore, during the pneumatic conveying process, the bulk material is moved from the tank truck to the storage/delivery system in a turbulent manner, leading to large amounts of dust and noise generation. The air used for conveying the material must be vented from the storage tank and typically carries an undesirable amount of dust with it. Attempts to control dust during the conveying process typically involve the rig up and use of auxiliary equipment, such as a dust collector and ductwork, adding cost and operator time to the material handling operations.

In addition, traditional material handling systems can have several transfer points between the outlets of multiple storage/delivery systems and a blender. These transfer points often have to be shrouded and ventilated to prevent an undesirable release of dust into the environment. Further, after the dust has been captured using the dust collectors and ventilation systems, additional steps are needed to dispose of the dust.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
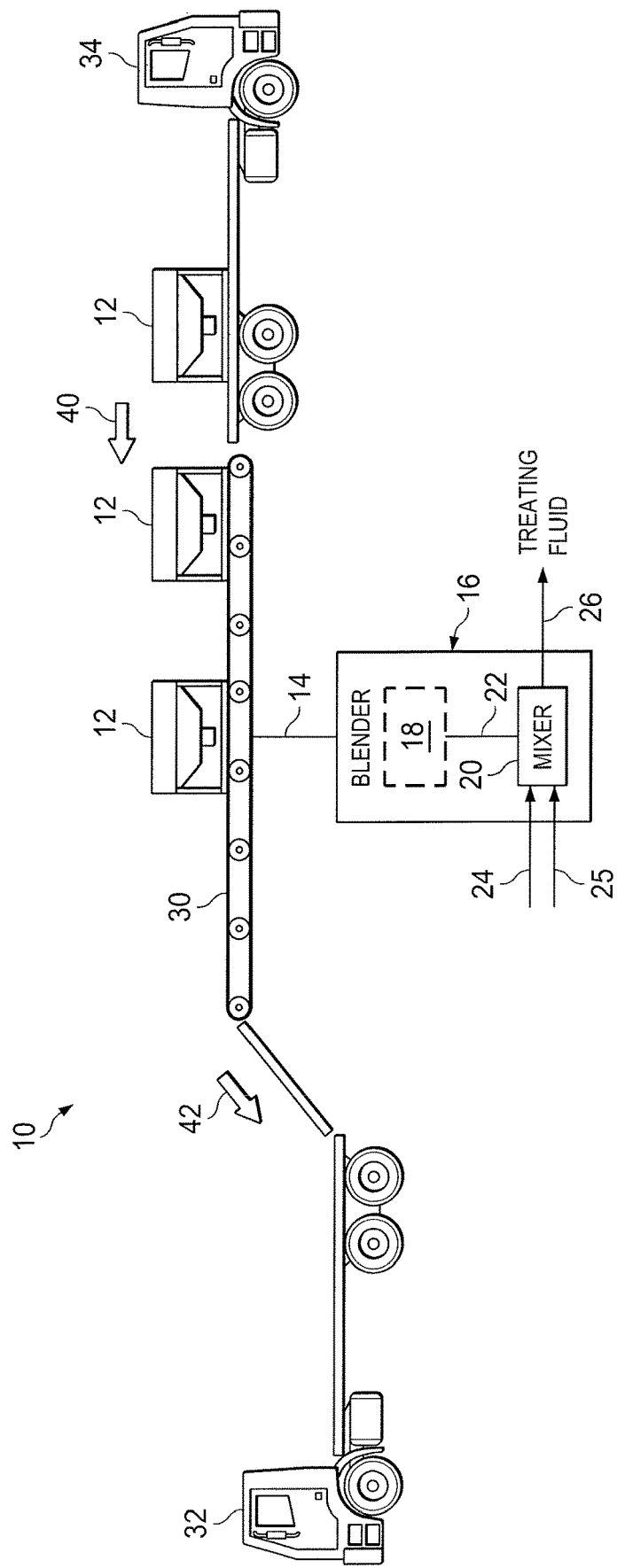
FIG. 1 is a schematic block diagram of a bulk material handling system suitable for delivering a container of bulk additive materials to a blender receptacle (e.g., blender tub or hopper) for mixing with liquids to form well treating fluids at a well site, in accordance with one embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments according to the present disclosure may be directed to systems and methods for managing bulk material (e.g., bulk solid or liquid material used on location)

efficiently at a well site. More specifically, the disclosed embodiments are directed to systems and methods for efficiently moving bulk material into a blender receptacle associated with a blender on location, which could be into a blender hopper or directly into a mixing tub of the blender. The present disclosure may include a system that utilizes multiple containers (e.g., pre-filled containers or filled on location) holding bulk material and positioned to transfer bulk material from the containers directly into the blender receptacle. The disclosed techniques may be used to efficiently handle any desirable bulk material having a solid or liquid constituency including, but not limited to, sand, proppant, gel particulate, dry-gel particulate, liquid additives, and others.

In currently existing on-site bulk material handling applications, bulk material (e.g., sand, proppant, gel particulate, or dry-gel particulate) may be used during the formation of treatment fluids. In such applications, the bulk material is transferred between transportation units, storage tanks, blenders, and other on-site components. The bulk material is often transferred pneumatically using pressurized airflows to provide the bulk material, for example, from a transportation unit (e.g., tank truck) to a storage/delivery system (e.g., silo). The bulk material may later be moved from the storage/delivery system to a hopper on a blender truck. A sand screw, chute, or other metering mechanism disposed in the hopper then meters the bulk material into a blender tub of the blender, where the bulk material is mixed with other materials (e.g., water, fluids, chemicals, etc.). In some instances, the bulk material can be transferred pneumatically from a transportation unit into a storage tank on the blender truck.

Pneumatic transfer methods are generally selected due to the simplicity of the process. However, certain inherent inefficiencies are associated with the above-described pneumatic transfer of bulk material at a well site. First, blowing the bulk material pneumatically from a transportation unit to a storage/delivery system is a time consuming process, taking at least an hour to empty a single truck. Although the pneumatic process of blowing bulk material into a storage container can be accomplished prior to using the bulk material in blender operations, the long amount of time spent pneumatically transferring the bulk material to the storage/delivery system can lead to high equipment/detention costs. Detention costs are associated with the transportation equipment (e.g., tank trucks) being positioned on location for a period of time. In some instances, the equipment on location may be arranged so that accessibility to storage/delivery systems is limited for transportation units being used to pneumatically fill the storage/delivery systems. As a result, a large amount of time can be wasted by trucks waiting to move into position as other trucks are unloading bulk material, or trucks waiting for the material already in a storage bin to be used to make room for the next load of material.

In addition, the pneumatic transfer of bulk material tends to require a large amount of air to move the material through the system. As this volume of air vents to the atmosphere, fine dust particles are entrained and released. It is undesirable for this dust to be released into the atmosphere. Accordingly, existing systems employ dust control techniques that often utilize large pieces of additional equipment, separate power supplies, and complicated setups. In addition, the pneumatic transfer process, as well as the systems used to control dust, can lead to an undesirable level of noise produced during bulk material transfer.

The bulk material container systems disclosed herein are designed to address and eliminate these shortcomings. The presently disclosed techniques use a plurality of linearly arranged containers, instead of a pneumatic transfer process, to move the bulk material from a transportation unit(s) to the blender receptacle (e.g., blender hopper or mixer). The transportation unit may deliver one or more containers full of bulk material to the well site, where the containers may then be aligned linearly and/or side-by-side over the blender receptacle. The containers may be positioned such that a container stack is disposed immediately above a pair of hoppers which deliver the two different types of material to a pair of associated silos for storage of different compositions of bulk material or such that two or more containers are arranged side-by-side each other immediately above a divided chamber hopper or associated pair of hoppers, which delivers the bulk material to the receptacle of the blender. The bulk material may be dispensed directly from the container(s) into the receptacle (e.g., via a chute, hatch, opening, etc.). A gravity feed outlet or chute may extend from the bottom of the containers, to route bulk material from the one or more containers directly into the blender receptacle. Since the transportation unit is able to unload the container stack or side-by-side arranged containers of bulk material without pneumatic transfer, the containers may be used to more efficiently transfer bulk material to the blender.

The container systems and methods described herein may reduce detention costs associated with bulk material handling at the location, since the efficient filling process may enable a quicker offloading of each tank truck, as compared to those that rely on pneumatic transfer. In addition, by eliminating the pneumatic conveyance process entirely, the stacked/side-by-side arranged container system may reduce the amount of dust generated at the location, as well as the noise levels associated with the bulk material transfer. The reduced dust generation may allow a reduction in the size of various dust control equipment used to ventilate the material handling system, leading to a reduction in overall cost, footprint, and rig-up time of the dust control equipment.

Turning now to the drawings, FIG. 1 is a block diagram of a bulk material handling system 10. The system 10 includes a plurality of containers 12, each designed for holding a quantity of bulk material (e.g., solid or liquid treating material). The containers 12 may utilize a gravity feed to provide a controlled, i.e., metered, flow of bulk material at an outlet 14. The outlet 14 may be a chute that conveys the bulk material from the containers 12 to a blender 16. As illustrated, the blender 16 may include a hopper 18 and a mixer 20 (e.g., mixing compartment). The blender 16 may also include a metering mechanism 22 (e.g., sand screw) for providing a controlled, i.e., metered, flow of bulk material from the hopper 18 to the mixer 20. However, in other embodiments the blender 16 may not include the hopper 18, such that the outlet 14 from the containers 12 may provide bulk material directly into the mixer 20. All such embodiments are intended to be encompassed by the present disclosure.

Water and other additives may be supplied to the mixer 20 (e.g., mixing compartment) through inlets 24 and 25, respectively. The bulk material and liquid additives may be mixed in the mixer 20 to produce (at an outlet 26) a fracturing fluid, gel, cement slurry, drilling mud, or any other fluid mixture for use on location. The outlet 26 may be coupled to a pump for conveying the treating fluid down hole into a well (e.g., a hydrocarbon recovery well) for a treating process. It should be noted that the disclosed container 12 may be utilized to provide bulk material for use in a variety of treating processes. For example, the disclosed systems and methods may be utilized to provide proppant materials into fracture treatments performed on a hydrocarbon recovery well. In other embodiments, the disclosed techniques may be used to provide other materials (e.g., non-proppant) for diversions, conductor-frac applications, cement mixing, drilling mud mixing, and other fluid mixing applications.

Figure 2:
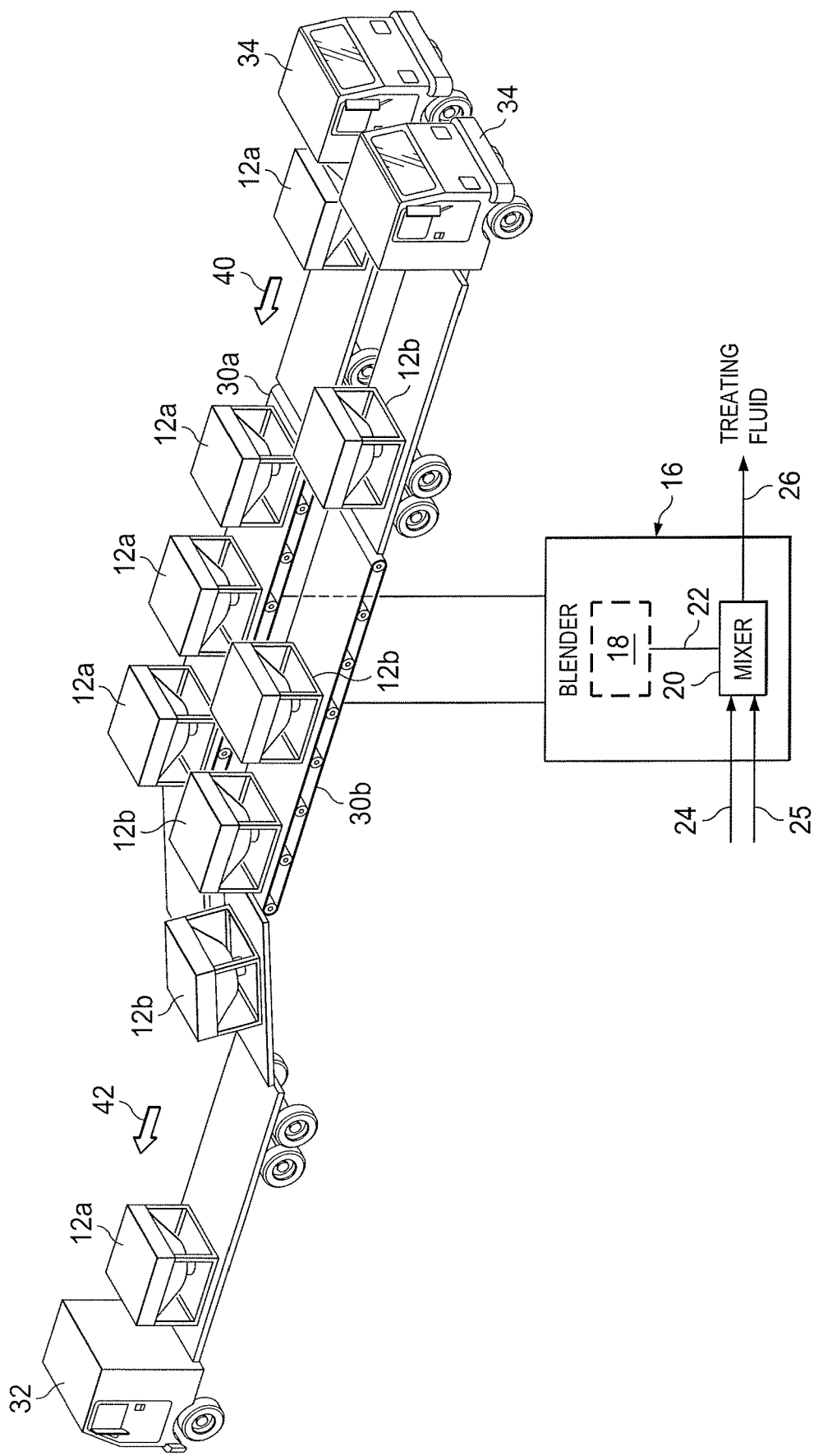
FIG. 2 is a schematic block diagram of a bulk material handling system suitable for delivering two containers of the same or different bulk additive materials simultaneously to a blender receptacle (e.g., blender tub or hopper) for mixing with liquids to form well treating fluids at a well site, in accordance with another embodiment of the present disclosure.

The containers 12 may be positioned in a side-by-side arrangement as illustrated in FIG. 2 with containers 12a and 12b. The containers 12 may be replaceable such that once the bulk material from one container 12 runs low, the empty container is moved off conveyor 30 and placed on a transportation unit (e.g., truck) 32, which carries away the empty containers for subsequent refilling offsite. Transportation unit(s) 34 is provided for delivering full containers 12 on one end of the conveyor 30, while transportation unit 32 is provided at the other end for receiving the empty containers. The transportation units 32, 34 can continuously supply containers 12 full of bulk material via the conveyor 30 to the blender 16, such that a continuous supply of bulk material is delivered to the blender 16.

As shown in FIG. 2, the two conveyors 30a and 30b may be positioned side-by-side over the blender 16 so that two containers 12a and 12b may be placed over the blender at a time. This arrangement can double the rate at which bulk material is being delivered to the blender 16. Each container 12a and 12b may hold the same type, particle size, and/or material of bulk material in some embodiments. In other embodiments, the containers 12a and 12b may hold different types, particle sizes, and/or materials of bulk material, to provide a desired treating fluid for the treating process being performed. For example, when performing fracturing operations, it may be desirable to initially pump a treating fluid having smaller proppant particles down hole, to start opening perforations formed within the well. After this, the fracturing treatment may proceed to pumping a treating fluid with large proppant particles down hole, to expand the openings in the perforations. The large proppant particles may be supplied from one container (e.g., forward container 12b) after the smaller proppant particles are used from the other container (e.g., rear container 12a). As those of ordinary skill in the art will appreciate, while only two conveyors 30a and 30b are shown disposed side-by-side over the blender 16, additional conveyors carrying additional containers may be arranged over the blender 16.

Transportation units 34 may be provided at the well site for storing one or more additional containers 12 of bulk material to be used at the site. Multiple transportation units 34 may act as a bulk storage system at the well site for holding large quantities of containers in reserve for use at the well. Before a treatment begins, one or more containers 12 of bulk material may be transferred from the transportation units 34 to conveyors 30a and 30b, as indicated by the arrow 40. This transfer may be performed by lifting the container 28 via a hoisting mechanism, such as a forklift or a crane or by sliding the containers off the back of the transportation units 34 directly onto the conveyors 30a and 30b via wheels attached to the containers 12 or the platform of the transportation units 34. Alternatively, the transportation units 34 themselves may be equipped with their own conveyors thereby permitting conveyor-to-conveyor transfer of the containers 12 from the transportation units 34 to the conveyors 30.

After one or more of the containers 12a and 12b on the conveyors 30a and 30b are emptied, the empty container(s) may be removed by advancing the conveyor(s) so as to move the empty container(s) to an empty transportation unit 32 used to haul the empty containers 12 away. In some embodiments, the one or more empty containers 12 may be positioned on a skid, a pallet, or some other holding area until they can be removed from the well site and/or refilled. In other embodiments, the one or more empty containers 12 may be positioned directly onto the empty transportation unit 32 for transporting the empty containers 12 away from the well site as shown by arrow 42. It should be noted that the same transportation unit 34 used to provide one or more filled containers 12 to the well site may then be utilized to remove one or more empty containers from the well site, i.e., serve as transportation unit 32.

Figure 3:
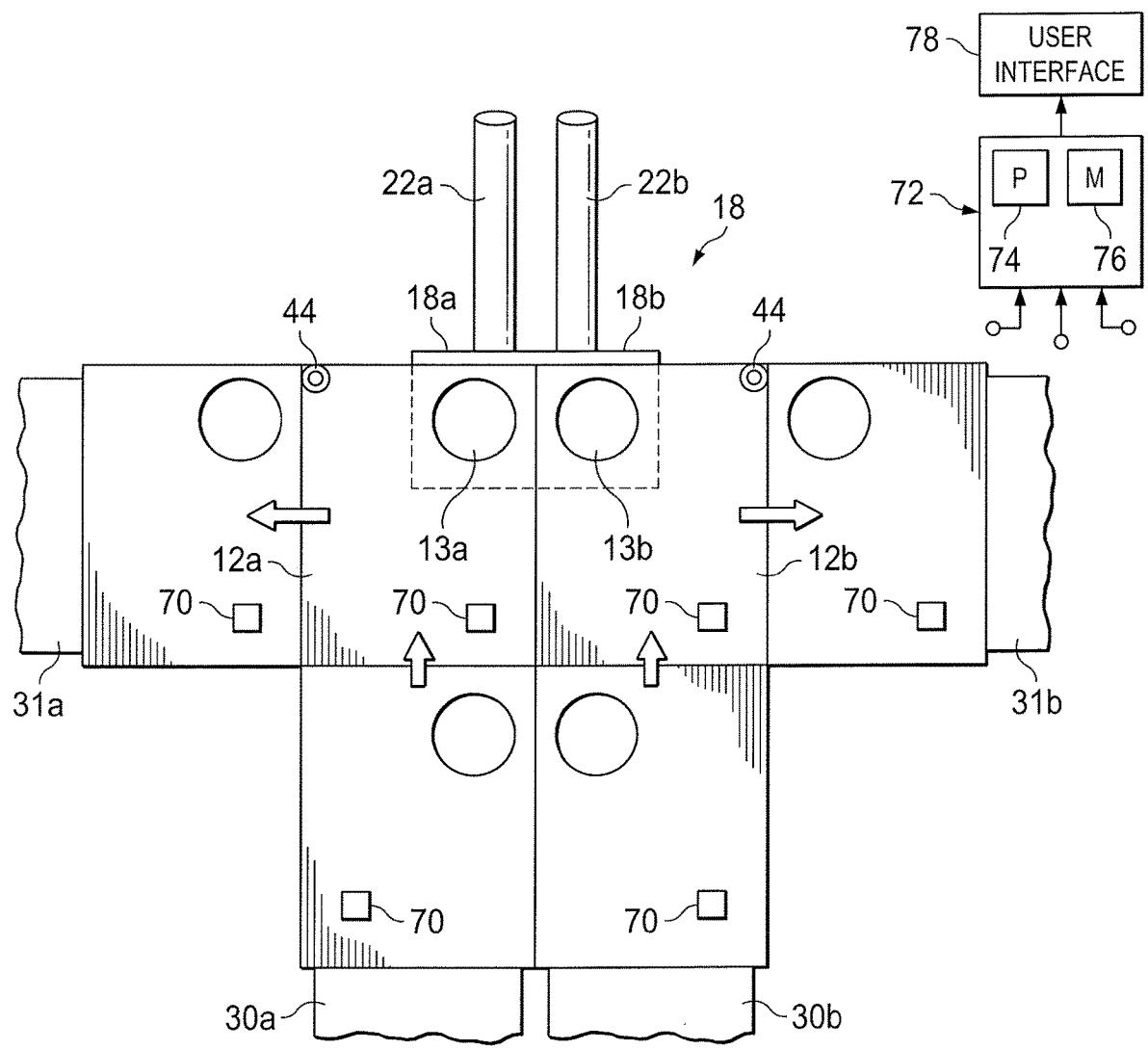
FIG. 3 is a schematic top view of a two-container bulk delivery system in a side-by-side orientation over a hopper and an associated metering mechanism connected thereto and a container delivery management system which interfaces therewith, in accordance with the embodiment illustrated in FIG. 2.

FIG. 3 shows an enlarged view of an embodiment where the containers 12a and 12b are disposed over a hopper 18 in the side-by-side configuration. The hopper 18 may be divided into two separate compartments 18a and 18b so that, if desired, different compositions of bulk material may be fed into the blender. Alternatively, separate hoppers may be utilized. Each of the compartments 18a and 18b are connected to associated metering mechanisms 22a and 22b, which transport the bulk material from the hopper 18 into the mixer 20. In this embodiment, given the generally narrow width of the hopper 18, the containers 12a and 12b are provided with openings 13a and 13b on one side of their bottom, desirably at one corner, so that the containers may be arranged on the conveyors 30a and 30b so that the openings 13a and 13b are juxtaposed adjacent to one another. It should be noted that a similar arrangement of containers 12a and 12b may be used in other embodiments to deliver bulk material from the containers 12a and 12b directly into the mixer of the blender, without using a hopper.

In some embodiments, each container 12 when filled to maximum capacity may hold approximately one small tank truckload of bulk material. To accommodate this amount of bulk material capacity, each of the containers 12 may have an internal volume of up to approximately 14 cubic meters for holding bulk material. In other embodiments, however, the containers 12 may hold a smaller or larger amount of bulk material than a tank truck.

Each of the containers 12 disposed above the blender 16 may provide a gravity feed of bulk material into the blender 16 (and optionally via the hopper 18). That is, the bulk material is moved from the containers 12 into the blender/hopper via gravity, instead of on a conveyor. This may keep the bulk material from generating a large amount of dust, since the bulk material is flowing into the blender/hopper instead of falling into the blender/hopper (which would cause air entrainment of the dust) as more capacity within the blender receptacle becomes available.

Figure 4:
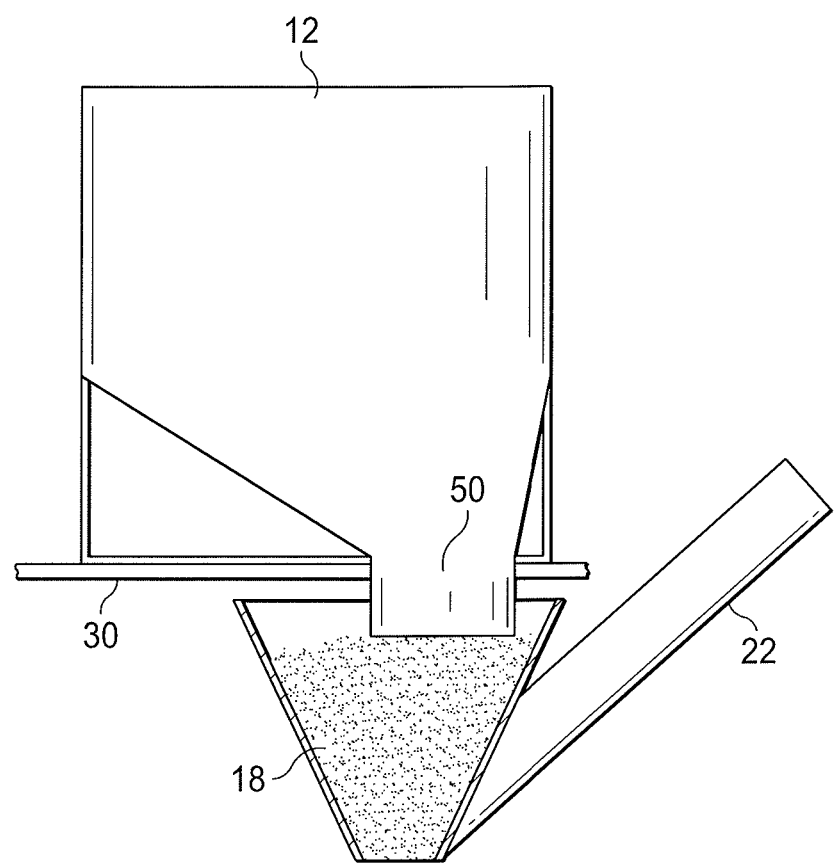
FIG. 4 is a schematic side view the container, hopper and associated metering mechanism shown in FIG. 3.

As shown in FIG. 4, the containers 12 may utilize a choke feed to meter the bulk material into the hopper 18 (or alternatively, directly into the mixer of the blender). This is accomplished with the aid of a chute 50, which is attached at the bottom of the container 12 through the openings 13. When an outlet valve or dumping mechanism on the containers 12 are actuated, the top of the chutes 50 may be opened and kept open while the chutes fill the hopper 18. The bulk material may travel down the chutes 50 and be discharged into the hopper 18 under a force due to gravity working on the bulk material. The chute 50 extends down into the hopper 18 such that the bottom of the chute is below the top edge of the hopper 18. This configuration enables the desired choke feeding to be accomplished. An additional aspect of this embodiment is that the conveyors 30 are open at the bottom so as to permit the flow of bulk material through the bottom of the conveyors 30 into the hopper 18.

In the illustrated embodiment, the containers 12a are labeled as holding a first type, particle size, or material of bulk material (A), while the containers 12b are labeled as holding a second type, particle size, or composition of bulk material (B). The bulk material A may be the same as or different from the bulk material B. As the container 12a outputs the bulk material A into the hopper 18, the bulk material B may be dispensed from container 12b into the hopper 18 via chute 50b. Alternatively, the flow of bulk material B may follow the flow of bulk material A where the type, particle size or composition of bulk material B is different from bulk material A and it is desired to have different treatment fluids entering the well bore at any given time. Once all the bulk material A is dispensed from the container 12a into the hopper 18, another container 12a is delivered along conveyor 30a to the dispensing region 54, which is located just above the top of the hopper 18. The conveyors 30 are designed such that the bulk material is permitted to fall out of the containers 12 into the hopper 18. Accordingly, in at least one embodiment therefore, they are formed by a pair of parallel open rails in the dispensing region 54. In such an embodiment, the containers 12 are at least formed of rails at their bottom surface, which can ride along the rails forming the conveyor. Structures such as wheels can incorporated either into the rails of the conveyor 30 or the rails on the containers 12 or both in such an embodiment. As those of ordinary skill in the art will appreciate, other configurations of the conveyors 30 and containers 12 may be employed to enable the containers to move laterally while at the same time dispense their load into the hopper 18.

It may be desirable, in some instances, to arrange the containers 12 in a desired order so that a desired bulk material is provided to hopper 18 at a certain time. Also, it may be desirable to arrange the containers 12 so that they are all designed to output the same bulk material into the hopper 18 at the same time.

Arranging the containers 12 along one or more parallel conveyors 30 may enable a more efficient use of space at the well site. This arrangement may also enable the transportation units 32, 34 to more efficiently maneuver through the well site, as they only need to park on two sides of the hopper 18 to provide new containers 12 to receive empty containers that are being removed from the conveyors 30.

The containers 12 are desirably shaped such that the bulk material is funneled downward under gravity to the openings 13. This may be accomplished using a variety of different shapes. One such exemplary shape is shown in FIG. 4, wherein main storage area of the containers 12 has a downwardly tapering shape. Other similar shapes may be used, e.g., a conical shape. The other dimensions of the containers 12 may be squared (as shown in FIGS. 1-4), rounded (not shown), cylindrical, oblong, oval, slightly bowed, or any other desirable shape. The containers 12 may be a "dump" type of container with one or more hatches at the bottom designed to automatically open in a manner that dumps the bulk material out of the container 12.

Figure 5:
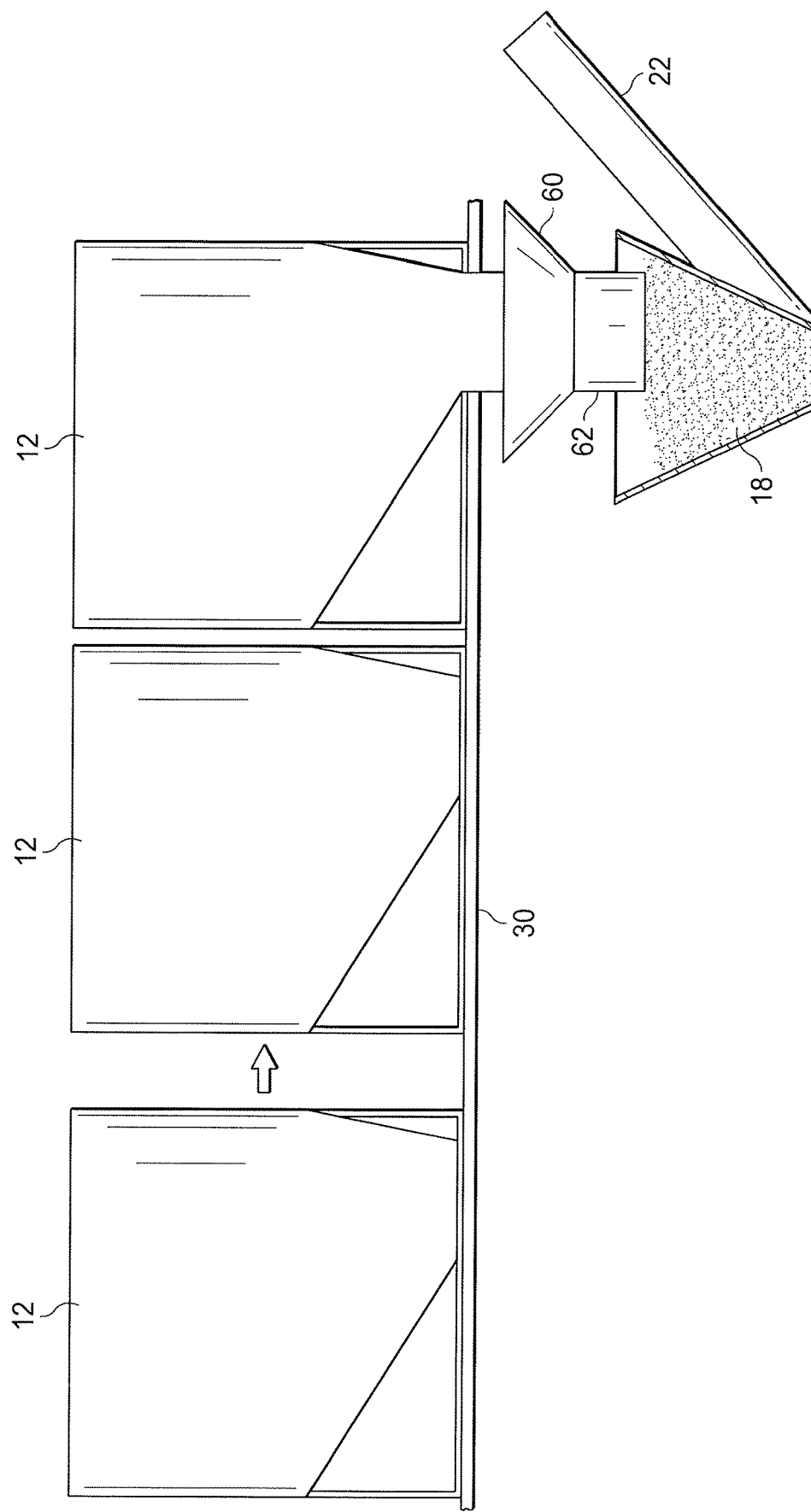
FIG. 5 is a side view of an alternate embodiment of the container, hopper and associated metering mechanism shown in FIG. 3, which incorporates a funnel to further direct the bulk material into the hopper.

A conically shaped funnel 60 may also be employed to further direct the bulk material from the containers 12 to the blender/hopper, as shown in FIG. 5. A chute 62 helps facilitate the transfer of the bulk material from the funnel 60 to the hopper 18. The bottom of the chute 62 is desirably disposed below the top of the hopper 18 to allow the bulk material to be choke feed into the hopper 18.

In some embodiments, the containers 12 may be partially or fully enclosed to guard the bulk material against the elements (e.g., sun, rain, and other weather). The containers 12 may be equipped with additional sidewalls disposed around the internal volume of the containers 12, for aesthetic reasons as well as to enable easier cleanup after the container 12 is emptied and removed from the conveyors 20. That is, any dust generated from within the internal volume of the container 12 may be contained within the additional sidewalls and enclosed portions and then subsequently removed or filtered, to prevent undesirable dust accumulation outside the container 12. In some embodiments, the containers 12 may be constructed with one or more coupling mechanisms (e.g., hooks, latches, slots) to enable engagement between the container 12 and a hoisting mechanism (e.g., crane, forklift, etc.) used to handle movement of the container 12.

Bulk material inventory tracking may be generally desired at the well site. As shown in FIG. 3, such bulk material inventory tracking may be accomplished through a number of different sensors 70 disposed about the well site. These sensors 70 may be communicatively coupled to one or more controllers 72 (e.g., automated control system), which utilize at least a processor component 74 and a memory component 76 to monitor and/or control inventory at the well site. For example, one or more processor components 74 may be designed to execute instructions encoded into the one or more memory components 76. Upon executing these instructions, the processors 74 may provide passive logging of the amount, type, and location of certain bulk materials at the well site. In some embodiments, the one or more processors 74 may execute instructions for controlling the amount, type, and location of bulk materials that are being transported about the well site. For example, the processors 74 may output signals at a user interface 78 for instructing operators to remove an empty container 12 from a conveyor 30 and replace the container 12 with a new container 12 holding a certain type of bulk material needed for the well treatment. Other types of instructions for inventory control/monitoring may be provided through the disclosed systems.

As noted above, the inventory control system 72 may include a number of different sensors 70. In some embodiments, these sensors 70 may include one or more load cells or bin full switches for tracking a level of bulk material in a container 12 and indicating whether a container 12 is empty, full, or partially full. Such sensors 70 may be used for any given container 12, the hopper 18, a silo, or any other component at the well site. In addition, in some embodiments the sensors 70 may include RFID tags used to provide an indication of the particle size, bulk volume, weight, type, material, and/or supplier of the bulk material disposed in a certain container 12. In such instances, the controller 72 may be communicatively coupled to an RFID reader disposed in proximity to the containers 12 being moved about the well site.

In some embodiments, the containers 12 may include one or more electronic sensors 70 used to determine and indicate whether the container 12 is full or empty. As noted above, such electronic sensors 70 may be communicatively coupled (e.g., wirelessly) to an automated control system 72. The sensors 70 may instruct the system 10 or operators to proceed to the next available container when an "empty" or "nearly empty" signal is detected. In other embodiments, the containers 12 may be equipped with a mechanical sensor or mechanical indicator for indicating whether the container 12 is full or empty.

It may be particularly desirable for the containers 12 of FIGS. 2 and 3 to be equipped with sensors 70 for detecting whether the container are full or empty. Once one of the containers 12 empty, an operator may receive an instruction from the automated control system 72 to remove and replace the empty container 12 with a new, full container. By constantly monitoring the level of the containers 12, the system and ensure that the hopper 18 is receiving a near continuous stream of bulk material from both containers. This additional bulk material capacity may enable the well treatment operations to continue as desired while operators are reloading the conveyors 30 with full containers 12.

The side-by-side embodiment disclosed in FIG. 3 further includes a pair of perpendicularly disclosed conveyors 31a and 31b, which join with conveyors 30a and 30b respectively to enable removal of empty containers 12 through a different pathway from which the full containers 12 entered the bulk delivery region. This design enables easy delivery and removal of the containers 12 into the bulk delivery region. Although not shown in FIG. 3, full containers may be delivered to via transport units 32 and removed via transport units 34, as shown in FIG. 2. Transfer of the containers from conveyors 30a and 30b to the conveyors 31a and 31b may be accomplished via bi-directional rollers 44, as shown in FIG. 3.

As described above, the disclosed system utilizes several relatively small, independent containers 12 to hold the bulk material needed for a well treatment, instead of a pneumatically filled silo. This arrangement of individual containers 12 may provide relatively easy methods for transporting the bulk material around the well site. For example, the containers 12 may enable quick unloading of a transportation unit and quick loading/re-loading of the conveyors 30 using a forklift, conveyor on the transportation unit, or other moving or hoisting mechanism. This type of unloading/loading may be accomplished more efficiently than a pneumatic loading process. In addition, the containers 12 may be quickly pushed out of the way and removed from the conveyors 30 once emptied. The smaller volumes of bulk material provided in the containers 12 may enable a relatively rapid change of the type of bulk material delivered to the hopper 18, allowing for quick customization of the well treatment. The multiple containers 12 (particularly when arranged in parallel tracks 30a and 30b feeding into the same hopper 18) may provide a buffer for bulk material delivery so that the hopper 18 is constantly being supplied with bulk material while transportation units are arriving and being unloaded at the well site. Furthermore, once the treatments are completed at the well site, any remainder of filled containers 12 may be easily transported off location.

By making the bulk material unloading/loading process on location more efficient, the disclosed techniques may reduce the detention costs accrued at the well site, since transportation units may be able to unload their materials faster than would be possible using pneumatics. In addition, the disclosed techniques may enable the transfer of bulk material on location without generating excessive noise that would otherwise be produced through a pneumatic loading process. Still further, the bulk material remains in the individual containers 12 until it is output directly into the hopper 18 via the corresponding chutes 52. Since the bulk material remains in the containers 12, instead of being released directly onto a conveyor, the containers 12 may enable movement of bulk material on location without generating a large amount of dust.

Figure 6:
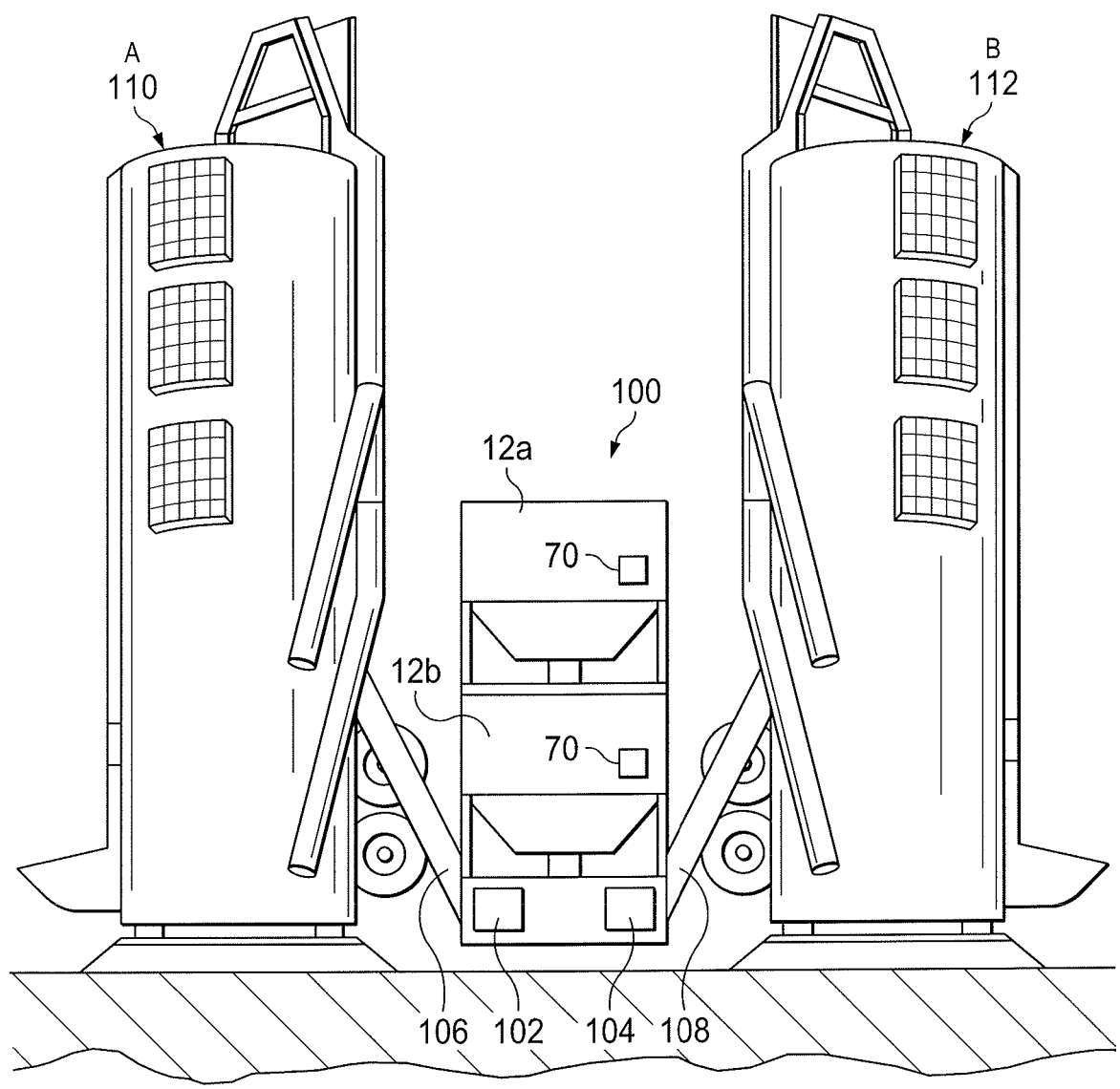
FIG. 6 is a schematic diagram of an alternate embodiment illustrating a container stack delivering bulk material to a pair of storage silos.

In an alternate embodiment, the containers 12a and 12b may be arranged in a stacked configuration 100, as shown in FIG. 6. The container stack 100 unloads the bulk material into a pair of fill hoppers 102 and 104. A pair of bucket elevators or bucket lifts 106 and 108 may be provided to transfer the bulk material from the fill hoppers 102 and 104 into the silos 110 and 112. The containers 12a and 12b are arranged such that the bulk material in container 12a may be emptied into container 12b such that once the bulk material from container 12a is emptied into container 12b, a new container 12a may be removed and positioned on top of container 12b to maintain a steady flow of bulk material through the bucket conveyor system 106, 108 and into the silos 110, 112. The silos 110, 112 may be utilized to hold a large amount of bulk material and to output a steady flow of bulk material to the blender 16 for forming the treating fluid when needed.

Each container 12a and 12b may hold the same type, particulate size, and/or composition of bulk material in some embodiments. In other embodiments, the containers 12a and 12b used to fill the silos 110, 112 may hold different types, particulate sizes, and/or compositions of bulk material, to provide a desired treating fluid for the treating process being performed. In such embodiments, the material in container 12a would not be emptied into container 12b, but rather would be emptied directly into fill hopper 102. The contents in fill hopper 12b would respectively be emptied into fill hopper 104, such that silo 110 could store one bulk material A and silo 112 could store another bulk material B. For example, when performing fracturing operations, it may be desirable to initially pump a treating fluid having smaller proppant particles downhole (e.g., Bulk Material A) to start opening perforations formed within the well. After this, the fracturing treatment may proceed to pumping a treating fluid with large proppant particles downhole (e.g., Bulk Material B) to expand the openings in the perforations. The large proppant particles may be supplied from one container 12a after the smaller proppant particles are used from another container 12b.

As mentioned above, the silos 110, 112 may also include the bucket conveyor systems having bucket lifts 106, 108 used in combination with fill hoppers 102, 104, respectively, to deliver bulk material into an internal storage volume of the silos 110, 112. The bucket lifts 106, 108 are generally a lift that uses multiple scoop-shaped components disposed along the lift to capture and transport the bulk material upward. As each scoop-shaped component (i.e., bucket) passes through the fill hoppers 102, 104 the buckets may scoop a certain amount of bulk material out of the fill hoppers, and the lift carries the filled buckets up toward the top of the silos 110, 112. From here, the buckets may be rotated downward to release the bulk material from the buckets into an internal storage volume of the silos 110, 112. In the illustrated embodiment, the buckets used to transport bulk material within the bucket lifts 106, 108 may be housed in enclosures (e.g., tubular enclosure) to reduce or eliminate an amount of dust released from the bucket lifts 106, 108 into the atmosphere.

In some embodiments, the bucket lifts 106, 108 and fill hoppers 102, 104 may be built into or integral with the silos 110, 112. In other embodiments, the bucket lifts 106, 108 may be a separate component from the silos 110, 112. Independent bucket lifts 110, 112 (i.e., those that are made separately and later attached to the silos 110, 112) may be manufactured for use with a particular storage silos 110, 112. The bucket lifts 106, 108 may be an inclined or angled lift in some embodiments.

The containers 12a and 12b shown in the embodiment of FIG. 6 may utilize a choke-feed mode to meter the bulk material from the emptying of the bulk material from the container 12a into container 12b and also from the emptying of the container 12b into the fill hoppers 102 and 104 (or alternatively from the containers 12a and 12b into the hoppers 102 and 104, respectively). Once a pile of bulk material is established within the fill hoppers 102, 104 (or within container 12b), this pile may regulate the amount of bulk material that can be directed from the container 12b into the fill hoppers 102, 104 (or from the container 12a into the container 12b).

Furthermore, the containers 12a and 12b shown in the embodiment of FIG. 6 may utilize the bulk material inventory tracking shown in FIG. 3. Thus, the sensors 70 may be integrated into the containers 12 and the controller 72 and user interface 78 may also be employed in this embodiment in the same way it is described as being employed in the embodiment shown and described in FIG. 3.

Although the present disclosure and its advantages have been described in detail, it should be understood that various changes, substitutions and alterations can be made herein without departing from the spirit and scope of the disclosure as defined by the following claims.

What is claimed is:

1. A system, comprising:
a blender receptacle associated with a blender;
a first conveyor, the first conveyor having an opening disposed over the blender receptacle;
a second conveyor, the second conveyor being disposed parallel to the first conveyor and having an opening disposed over the blender receptacle;
a first container holding bulk material, the first container supported on the first conveyor over the blender receptacle and having an opening for dispensing bulk material into the blender receptacle, the opening of the first container being directly aligned in a vertical direction with the opening in the first conveyor;
a second container holding bulk material, the second container supported on the second conveyor over the blender receptacle and having an opening for dispensing bulk material into the blender receptacle, the opening of the second container being directly aligned in a vertical direction with the opening in the second conveyor;
wherein the openings in the first and second container are disposed adjacent one another;
wherein the first conveyor defines a path, wherein the second conveyor defines a path, wherein one or both of the first conveyor and the first container comprises a moving portion allowing transportation of the first container along the path of the first conveyor, and wherein one or both of the second conveyor and the second container comprises a moving portion allowing transportation of the second container along the path of the second conveyor.

2. The system of claim 1, wherein the opening of the first container is disposed at one side of a bottom surface of the first container, and wherein the opening of the second container is disposed at one side of a bottom surface of the second container.

3. The system of claim 2, wherein the openings in the first and second containers are disposed in adjacent corners.

4. The system of claim 1, wherein the first and second containers each hold the same type of bulk material.

5. The system of claim 1, wherein the first and second containers each hold a different type of bulk material.

6. The system of claim 1, wherein the blender receptacle comprises a mixer of the blender where the bulk material is mixed with additives to generate a treatment fluid.

7. The system of claim 1, wherein the blender receptacle comprises a hopper connected to a metering device, which meters the bulk material into a mixer of blender.

8. The system of claim 7, further comprising a funnel disposed below the openings in the first and second containers, the funnel directing bulk material into the blender receptacle.

9. The system of claim 1, wherein the first container has a chute which extends from the opening in the first container into the blender receptacle and the second container has a chute which extends from the opening in the second container into the blender receptacle.

10. The system of claim 9, wherein the chutes of the first and second containers extend into the blender receptacle so as to provide a choke feed for the bulk material output from the first and second containers.

11. The system of claim 1, further comprising a third conveyor disposed perpendicular to the first conveyor, the third conveyor capable for removing the first container from the first conveyor, and a fourth conveyor disposed perpendicular to the second conveyor, the fourth conveyor capable of removing the second container from the second conveyor.

12. The system of claim 11, wherein the first and second conveyors are equipped with bi-axial rollers that redirect the movement of the first and second containers from the first and second conveyors to the third and fourth conveyors respectively.

13. The system of claim 1, further comprising one or more sensors disposed on the first container for tracking a fill level of bulk material in the first container and one or more sensors disposed on the second container for tracking a fill level of bulk material in the second container.

14. The system of claim 13, further comprising a user interface connected to a controller, which communicates with the one or more sensors on the first and second containers to notify an operator to remove and replace the first and second containers.

15. The system of claim 1, wherein the first and second containers both comprise a square, round, cylindrical, oblong, oval, or sack shaped container having a downward conical configuration enhancing the gravity feed of the bulk material out of the openings.

16. The system of claim 1, wherein the first container is supported on the first conveyor at a location directly above the blender inlet in a vertical direction, and wherein the second container is supported on the second conveyor at a location directly above the blender inlet in a vertical direction.

* * * * *